United States Patent [19]
Mishina et al.

[11] Patent Number: 5,258,873
[45] Date of Patent: Nov. 2, 1993

[54] IMAGE-READING DEVICE

[75] Inventors: Yoshihiko Mishina; Masaaki Oda; Yutaka Yamamoto; Takayuki Tanaka, all of Otake, Japan

[73] Assignee: Mitsubishi Rayon Company Ltd., Tokyo, Japan

[21] Appl. No.: 865,267

[22] Filed: Apr. 8, 1992

[51] Int. Cl.⁵ .......................... G02B 3/00; G02B 7/02
[52] U.S. Cl. ................................... 359/654; 359/652; 359/820
[58] Field of Search ............... 359/652, 653, 654, 820

[56] References Cited

FOREIGN PATENT DOCUMENTS 0316507 5/1989 European Pat. Off. .
0426441 5/1991 European Pat. Off. .

OTHER PUBLICATIONS

Patent Abstracts of Japan, vol. 13, No. 74 (E-717) Feb. 20, 1989, and JP-A-63 254 854, Oct. 21, 1988, Watanabe Hiroyuki, "Solid-State Image Pickup Device".
Patent Abstracts of Japan, vol. 16, No. 252 (P-1367), Jun. 9, 1992, and JP-A-40 58 201, Feb. 25, 1992, Takami Manabu, "Rod Type Micro Lens Array".
Database WPIL, an 86-121311, and JP-A-61 058 838, "Lens Array Production Without Polishing Process—Includes Heating Lens Material to be Fused and Dropped Through Holes Onto Base Plate for Solidifying".

Primary Examiner—Scott J. Sugarman
Attorney, Agent, or Firm—Oblon, Spivak, McClelland, Maier & Neustadt

[57] ABSTRACT

An image-reading device comprises a lens unit array comprising an array of distributed refractive index plastic cylindrical lens elements and plastic plates, adhering the distributed refractive index plastic cylindrical lens elements therebetween, and a plastic case containing and holding the lens unit array. The difference in the thermal expansion coefficients of the plates of the lens unit array and the plastic case is $5.0 \times 10^{-5}$ cm/cm/° C. or below, or more preferably, $3.0 \times 10^{-5}$ cm/cm/° C. or below. The plastic case is formed by connecting, in a longitudinal arrangement, a plurality of case segments formed by an injection molding.

9 Claims, 2 Drawing Sheets

5,258,873

IMAGE-READING DEVICE

BACKGROUND OF THE INVENTION

1. Field of the Invention

The present invention relates to a lightweight image-reading device comprising a lens array and plastic substrates contained in a case, the device being capable of reading images with a high reading accuracy and of being assembled by an automatic assembling process.

2. Description of the Related Art

The inventors of the present invention succeeded in developing plastic cylindrical lenses having a uniform refractive index distribution and having a uniform conjugate length, as disclosed in WO 09/05274. These plastic cylindrical lenses are formed of filaments produced by a true conjugate spinning process for continuously spinning a plurality of plastic compounds having different refractive indices. The uniformity of the performance of these cylindrical lenses having a uniform refractive index distribution is higher than that of glass cylindrical lenses, and thus the distributed refractive index cylindrical lens unit array comprising plastic cylindrical lenses has a superior uniformity of performance when compared to a distributed refractive index cylindrical lens unit array comprising glass cylindrical lenses.

The distributed refractive index cylindrical lens unit array comprising plastic cylindrical lenses is lightweight, which is advantageous for an application thereof to an image-reading device for copy machines and facsimile terminal equipment, which must be compact and have a lightweight construction.

FIG. 1 is a sectional view of a prior art image reading device constructed by placing a lens unit array 14 formed by adhering an array of a plurality of distributed refractive index cylindrical lens elements between two plates 12 and 13 held in a case 11. The case 11 is usually formed by die-casting or drawing light metals such as aluminum. In FIG. 1, 15 is a CCD sensor for converting image information read by a lens unit array 14 into corresponding electric signals; 16 is a light source; 17 is a cover glass; 18 and 18' are screws for securing the lens unit array 14 in case 11, and 19 and 19' are projections on which the lens unit array 14 is fixed.

The rapid progress in the reduction in weight and size of copying machines and facsimile terminal equipment requires the use of an image reading device having a lightweight construction and comprising a lens unit array having a fixed conjugate length, since the image reading device is to be incorporated into lightweight, compact copying machines and facsimile terminal equipment. To meet such requirements, an image reading device composed of a lens unit array formed by adhering an array of distributed refractive index cylindrical lens elements between plastic plates held in a case formed by die-casting aluminum has been developed. The MTF (modulation transfer factor) of this image reading device, measured by using a grid of four pairs of lines per millimeter, was as high as 50% or above, but this MTF dropped sharply to 30% or below when the MTF was measured after subjecting the image reading device to a heat cycle test as shown in FIG. 3, thereby proving that the performance of the image reading device is not stable.

SUMMARY OF THE INVENTION

The inventors of the present invention made intensive studies to develop an image-reading device capable of solving the foregoing problems and as a result, found that an image-reading device comprising, in combination, a lens unit array meeting particular conditions and a plastic case, is capable of achieving the object of the present invention.

Namely, the object of the present invention is to provide an image-reading device comprising a lens unit array formed by adhering an array of distributed refraction index cylindrical lens elements having a uniform lens length between two plastic plates contained in a plastic case. The materials respectively forming the plastic case and the plastic plates of the lens unit array are selected such that the difference in the thermal expansion coefficients of the materials is $5.0 \times 10^{-5}$ cm/cm/° C. or below.

The present invention can preferably employ distributed refractive index plastic cylindrical lens elements manufactured by, for example, a process disclosed in WO 91/05274. Concretely, the distributed refractive index plastic cylindrical lens elements may be manufactured by feeding at least three syrupy plastic compounds having different refractive indices into a spinneret having coaxial annular chambers, such that the plastic compounds having smaller refractive indices are fed into the outer annular chambers of the spinneret. Plastic compounds for a true conjugate spinning are then extruded, to thereby produce conjugate filaments, which are then hardened and cut to a desired length.

The plastic plates used in the present invention to adhere an array of the cylindrical lens elements may be formed of a thermoplastic resin or a crosslinked thermosetting resin, such as a polymethyl methacrylate resin, a polyacetal resin, an ABC resin, a polycarbonate resin, a polyamide resin, a polyester resin, a 4-methylpentene-1 polymer, an epoxy resin or an unsaturated polyester resin.

Further, the plastic plates may contain a light absorbing additive, such as carbon black, or a reinforcing material, such as carbon fibers, glass fibers or whiskers. Preferably, the thermal expansion coefficient of the plastic plates is from $0.5 \times 10^{-5}$ to $10.0 \times 10^{-5}$ cm/cm/° C.

Also, the plastic plates may be formed by an injection molding process, an extrusion molding process or a compression molding process.

There are few limitations on the materials used for forming the plastic case, but to form an image-reading device with lightweight construction, and to provide an image-reading device capable of maintaining a desired performance when exposed repeatedly to heat, preferably a plastic case formed of a plastic suitable for injection molding and having a thermal expansion coefficient of from $0.5 \times 10^{-5}$ to $10.0 \times 10^{-5}$ cm/cm/° C., such as a polycarbonate resin, a 4-methylpentene-1 polymer, a polyacetal resin, an ABC resin, a polyamide resin or a polyester resin, is used.

Also, the plastic case is preferably blended with a carbon black or reinforced by reinforcing material, such as carbon fibers or glass fibers, to thereby improve the dimensional stability thereof.

The difference between the respective thermal expansion coefficients of the plastic plates and the plastic case must be $5.0 \times 10^{-5}$ cm/cm/° C. or below, or more preferably, $3.0 \times 10^{-5}$ cm/cm/° C. or below. If the difference in the thermal expansion coefficients of the plastic plates and the plastic case is greater than $5.0\times10^{-5}$ cm/cm/° C., the sensitivity of an image-reading device employing such a plastic case and such plastic plates drops sharply when the image-reading device is repeatedly subjected to heat, and thus the device will not function satisfactorily.

The case of the conventional image-reading device employing a lens unit comprising an array of distributed refractive index cylindrical lens elements, is formed by die casting or drawing aluminum. The image-reading device of the present invention must have a lightweight construction, be capable of a fast image reading, and be sufficiently resistant to repeated applications of heat. A significant feature of the present invention is that these requirements are satisfied by using a plastic case, which hitherto has been considered impossible, having a specific thermal expansion coefficient relative to that of the plates of a lens unit.

The plastic case of the present invention may be formed by an extrusion molding process or an injection molding process, but since the plastic case must be formed with high-dimensional accuracy, the case is preferably formed by an injection molding process. The case must be able to hold the lens unit array and the CCD sensor to convert image information read by the lens unit array into corresponding electric signals in the plastic case, in an accurate positional relationship. Namely, the accuracy of the positional relationship between the lens unit array and the CCD sensor must be maintained even if the image-reading device is repeatedly exposed to heat.

Also, when forming the plastic case with high-dimensional accuracy, the plastic case is preferably constructed by combining a necessary number of case segments having a length of 10 to 100 mm, or more preferably, 20 to 50 mm, and formed by an injection molding process. It is not preferable to construct the plastic case by combining case segments having a length of less than 10 mm, because it is difficult to construct the plastic case with a satisfactory dimensional accuracy by combining a high number of case segments. Also, it is difficult to construct the plastic case by combining case segments having a length exceeding 100 mm, because the plastic material is unable to flow uniformly in the mold when forming case segments having a length exceeding 100 mm, by injection molding.

Preferably, the plastic case is constructed by joining two to twenty case segments by an adhesive, or by assembling case segments having a connecting means such as the connecting hooks 502 and holes 503 shown in FIG. 5, i.e., by engaging the engaging hooks of the case segments with the holes formed in the adjacent case segments. The plastic case can be constructed with a very high-dimensional accuracy by assembling the case segments as shown in FIG. 5, and an image-reading device held in this plastic case has satisfactory image-reading characteristics.

The present invention employs plastic cylindrical lens elements having a superior uniformity of the conjugate length thereof, compared to distributed refractive index glass cylindrical lens elements, an array of the plastic cylindrical lens elements is adhered to and between plates having a specific thermal expansion coefficient, to form a lens unit array, and the lens unit array is held in a plastic case having a specific thermal expansion coefficient, to thereby form an image-reading device. Accordingly, the lens unit array and the plastic case can be readily be assembled, and as the difference between the image-reading characteristics of the image-reading device during image-reading operations under a high-temperature condition and those of the same operating under a low-temperature condition is insignificant, the image-reading device is able to operate satisfactorily regardless of temperature changes.

BRIEF DESCRIPTION OF THE DRAWINGS

The aforementioned and other objects, features and advantages of the present invention will become more apparent from the following description, taken in connection with the accompanying drawings in which.

DESCRIPTION OF THE PREFERRED EMBODIMENTS

Example 1

Figure 1:
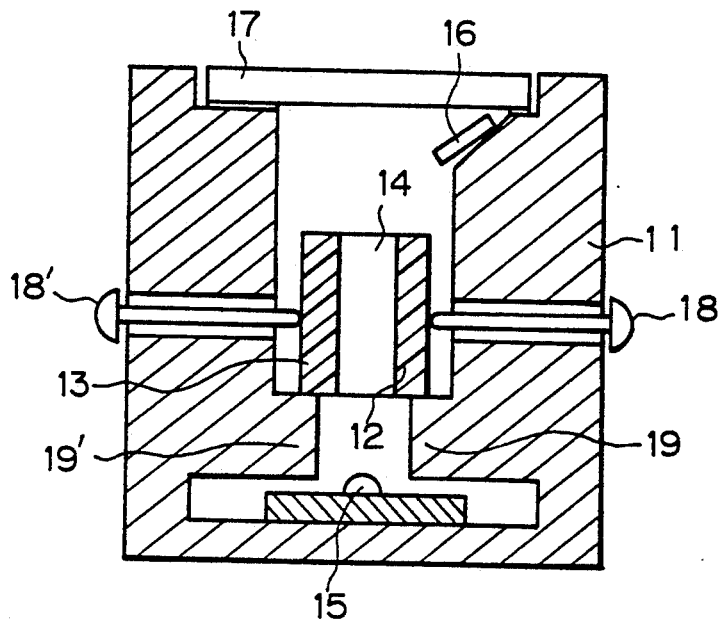
FIG. 1 is a sectional view of an image-reading device incorporating a lens unit array comprising an array of conventionally distributed refractive index cylindrical lens elements.

A mixture of 46 parts by weight of polymethyl methacrylate ($[\eta]=0.56$, measured in methyl ethyl ketone (MEK) at 25° C.), 44 parts by weight of benzyl methacrylate, 10 parts by weight of methyl methacrylate, 0.2 parts by weight of 1-hydroxycyclohexylphenyl ketone and 0.1 parts by weight of hydroquinone, was mixed at 70° C. to prepare a first dope for forming a first layer (the core) of a conjugate filament.

A mixture of 50 parts by weight of polymethyl methacrylate ($[\eta]=0.41$, measured in MEK at 25° C.), 50 parts by weight of methyl methacrylate, 0.2 parts by weight of 1-hydroxycyclohexylphenyl ketone and 0.1 parts by weight of hydroquinone, was mixed at 70° C. to prepare a second dope for forming the second layer of the conjugate filament.

A mixture of 45 parts by weight of polymethyl methacrylate ($[\eta]=0.34$, measured in MEK at 25° C.), 35 parts by weight of 2,2,3,3,4,4,5,5-octafluoropentyl methacrylate, 20 parts by weight of methyl methacrylate, 0.2 parts by weight of 1-hydroxycyclohexylphenyl ketone and 0.1 parts by weight of hydroquinone, was mixed at 70° C. to prepare a third dope for forming the third layer (the outer layer) of the conjugate filament.

The first, second and third dopes were extruded through a coaxial three-component conjugate spinneret by a conjugate spinning machine, to produce a strand of conjugate filaments. The first dope having a viscosity of $4.5\times10^4$ poise, the second dope having a viscosity of $2.0\times10^4$ poise, and third dope having a viscosity of $2.2\times10^4$ poise were fed to the coaxial three-component conjugate spinneret heated at 55° C., such that the refractive indices of the outer layers of the conjugate filaments are lower than those of the inner layers of the same.

Then, the strand was passed through an interlayer diffusing unit 90 cm in length and through the central region of an irradiating unit formed by arranging twelve 40-W fluorescent lamps 120 cm in length in a circle at equal angular intervals. Light transmission filaments having a radius $r_0$ of 0.50 mm thus formed were taken up by using takeup rollers at a winding speed of 50 cm/min. The ratio of discharge rates of the first, second and third dopes was 1:1:1. The distributed refractive index cylindrical lens thus produced had a central refractive index $n_0$ of 1.512, a peripheral refractive index of 1.470, and a refractive index distribution constant g of 0.52.

The cylindrical lens thus produced was cut to obtain lens elements 7.2 mm in length, and the opposite ends of the lens elements were polished. The MTF of the lens element, measured by using a grid of four pairs of lines per millimeter, was 57%, and the conjugate length of the same was 15.4 mm. A sharp image of the grid with a slight distortion was formed by the lens element.

Figure 2:
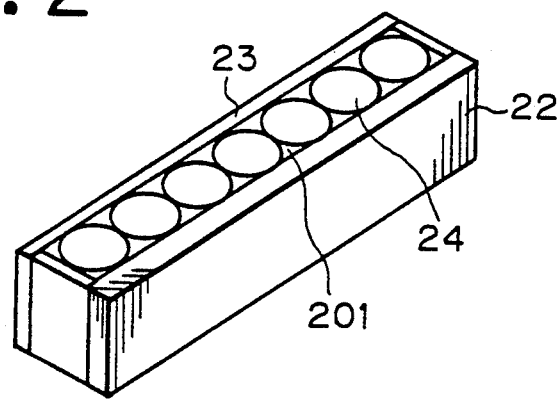
FIG. 2 is a perspective view of a lens unit array comprising distributed refractive index cylindrical lens elements.

As shown in FIG. 2, a plurality of the cylindrical lens elements arranged in an array were fixed by an adhesive 201 between two plastic plates 22 and 23 to form a lens unit array 230 mm in length, 7.2 mm in width, and 2.8 mm in thickness. The adhesive 201 was an epoxy adhesive. The end surfaces of the lens unit were mirror-finished by polishing. Plates 22 and 23 were formed by molding an ABS resin containing carbon black by an injection molding process. The measured thermal expansion coefficient of the plates 22 and 23 in a temperature range of $-20°$ C. to $60°$ C. was $7 \times 10^{-5}$ cm/cm/$°$ C. The thermal expansion coefficients referred to in the following description are those measured in a temperature range of $-20°$ C. to $60°$ C.

Figure 3:
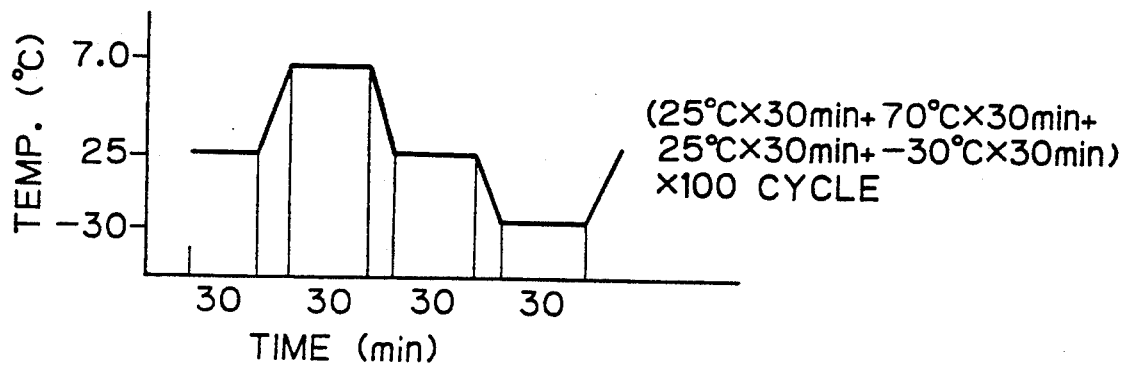
FIG. 3 is a diagram showing a heating mode for a heat cycle test.
Figure 4:
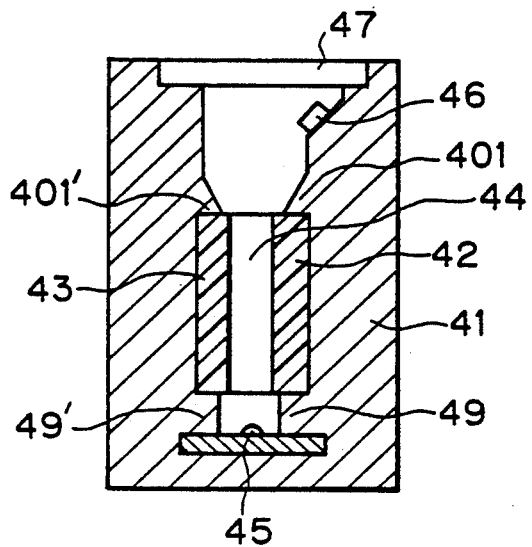
FIG. 4 is a sectional view of an image-reading device in a preferred embodiment according to the present invention.

As shown in FIG. 4, a plastic case 41 of 235 mm in length, having a pair of projections 49 and 49', and a pair of projections 401 and 401' for fixedly holding the lens unit array, was fabricated by molding an ABS resin containing carbon black. The measured thermal expansion coefficient of plastic case 41 was $7.5 \times 10^{-5}$ cm/cm/$°$ C. and the relative warp between opposite ends of the plastic case 41 was 1.1 mm. The lens unit array was mounted on the plastic case 41, and a CCD sensor 45, a light source 46 and a glass cover 47 were attached to plastic case 41, to thus complete an image-reading device. The MTFs of the image-reading device over the entire width of the lens unit array, measured by using a grid of four pairs of lines per millimeter, were 50% or above. The measured MTFs of the image-reading device over the entire width of the lens unit array, after a heat cycle test conducted under a heating condition shown in FIG. 3, were 47% or above.

Example 2

An image-reading device of example 2 was identical with that of example 1, except that the plastic case employed in example 2 was different from that employed in example 1.

A plastic case 41, as shown in FIG. 4 was formed by molding a polycarbonate resin containing carbon black. The measured thermal expansion coefficient of the plastic case 41 was $4 \times 10^{-5}$ cm/cm/$°$ C., and the relative warp between the opposite ends of the plastic case 41 was about 1.5 mm. An image-reading device, similar to that of example 1, was fabricated by using the plastic case 41. The MTFs of the image-reading device over the entire width of the lens unit array, measured by using a grid of four pairs of lines per millimeter, were 50% or above. The MTFs of the image-reading device after a heat cycle test under a heating condition as shown in FIG. 3 were 45% or above, which is sufficiently large for practical application.

Example 3

The image-reading device of example 3 was identical with that of example 1, except that the plastic case employed in example 3 was different from that employed in example 1.

A plastic case 41 as shown in FIG. 4 was formed of a glass fiber-reinforced ABS resin having a glass fiber content of 20 wt % and containing carbon black. The measured thermal expansion coefficient of the plastic case 41 was $5.2 \times 10^{-5}$ cm/cm/$°$ C., and the relative warp between opposite ends of the plastic case 41 was 1.0 mm. An image-reading device was fabricated by using the plastic case 41. The MTFs of the image-reading device over the entire width of the lens unit array, measured by using a grid of four pairs of lines per millimeter, were 48% or above. The MTFs of the image-reading device after a heat cycle test under a heating condition, as shown in FIG. 3, were 47%, which is sufficiently large for practical application.

Example 4

The image-reading device of example 4 is identical with that of example 1, except that the plastic plates employed in a lens unit array in example 4 were different from those employed in example 1.

The plastic plates 42 and 43 were formed of a glass fiber-reinforced ABS resin having a glass fiber content of 20 wt % and containing carbon black. The measured thermal expansion coefficient of plastic plates 42 and 43 was $4.9 \times 10^{-5}$ cm/cm/$°$ C. An image-reading device was formed by assembling the lens unit array and the same plastic case 41 as that employed in example 1. The MTFs of the image-reading device over the entire width of the lens unit array, measured by using a grid of four pairs of lines per millimeter, were 48% or above. The MTFs of portions of the image-reading device around screws 18 and 18' after a heat cycle test conducted under a heating condition as shown in FIG. 3, were 45%, which is sufficiently large for practical application.

Example 5

A lens unit array similar to that of example 1 was fabricated by using the plastic plates 42 and 43 formed of a carbon fiber-reinforced ABS resin having a carbon fiber content of 30 wt %. The measured thermal expansion coefficient of the plastic plates 42 and 43 was $1.2 \times 10^{-5}$ cm/cm/$°$ C. A plastic case 41, similar to that of example 1, was formed of a carbon fiber-reinforced ABS resin having a carbon fiber content of 30 wt %. The measured thermal expansion coefficient of the plastic case was $1.1 \times 10^{-5}$ cm/cm/$°$ C. and the relative warp between opposite ends of the plastic case 41 was substantially zero. An image-reading device was formed by assembling the lens unit array and plastic case 41. The MTFs of the image-reading device over the entire width of the lens unit array, measured by using a grid of four pairs of lines per millimeter, were 50% or above. The MTFs of the image reading device over the entire width of the lens unit array, measured after a heat cycle test conducted under a heating condition, as shown in FIG. 3, were 50% or above.

Comparative Example 1

The image-reading device of comparative example 1 is identical with the image-reading device of example 1, except that the image-reading device of comparative example 1 employs an aluminum case 41, as shown in FIG. 4. The measured thermal expansion coefficient of aluminum case 41 was $2 \times 10^{-5}$ cm/cm/° C. The MTFs of the image-reading device over the entire width of the lens unit array, measured by using a grid of four pairs of lines per millimeter, were 50% or above. The MTFs of the image-reading device, measured after a heat cycle test conducted under a heating condition, as shown in FIG. 3, were as low as 40%.

Comparative Example 2

The image-reading device of comparative example 2 was fabricated by using the lens unit array of the image-reading device of example 1 and the plastic case 41 of the image reading device of example 5. The MTFs of the image-reading device over the entire width of the lens unit array, measured by using a grid of four pairs of lines per millimeter, were 50% or above. The difference in thermal expansion coefficient between the lens unit array plate and the plastic case 41 was $5.9 \times 10^{-5}$ cm/cm/° C. The MTFs at opposite ends of the image-reading device after a heat cycle test conducted under a heating condition, as shown in FIG. 3, decreased to 25%, which proved that a practical application of the image-reading device was impossible.

Comparative Example 3

The image-reading device of comparative example 3 was fabricated by using the lens unit array employed in the image-reading device of example 5 and the plastic case 41 employed in the image-reading device of example 1. The MTFs of the image-reading device over the entire width of the lens unit array, measured by using a grid of four pairs of lines per millimeter, were 50% or above. The MTFs of the image-reading device at opposite ends, after a heat cycle test conducted under a heating condition, as shown in FIG. 3, decreased to 25%, which proved that a practical application of the image-reading device was impossible.

Example 6

Plastic plates 235 mm in length, 7.2 mm in width, and 2.8 mm in thickness, for a lens unit array, were formed of an ABS resin containing carbon black. The measured thermal expansion coefficient of the plastic plates was $3.7 \times 10^{-5}$ cm/cm/° C.

Figure 5:
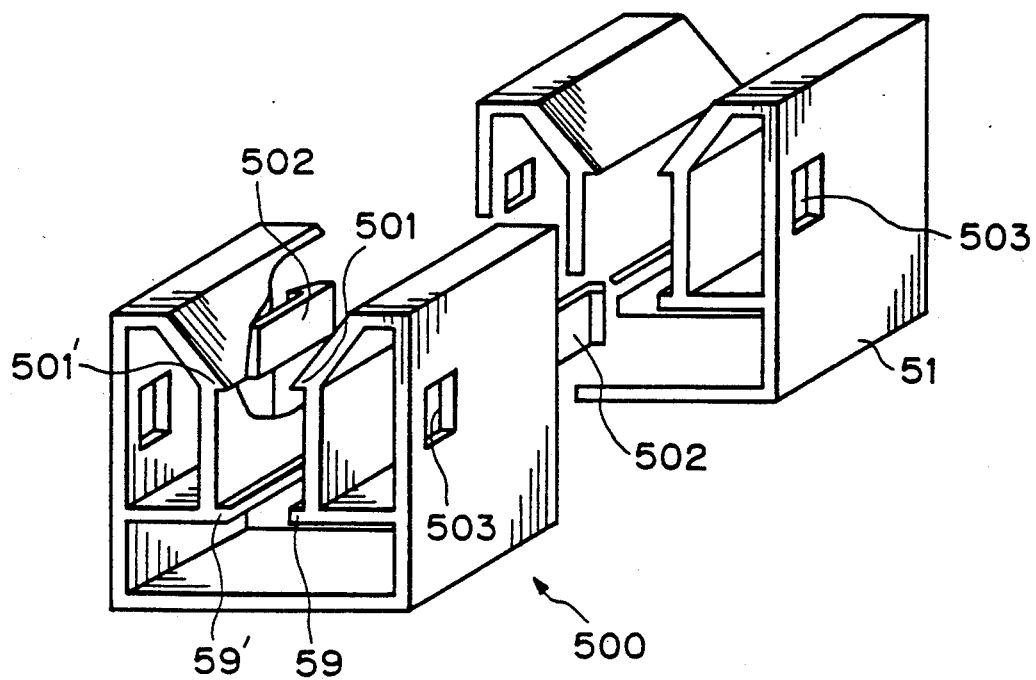
FIG. 5 is a perspective view of case segments suitable for constructing a plastic case for an image-reading device in accordance with the present invention.

A plastic case employed in the image-reading device of example 6 was constructed by successively joining twelve case segments 51, each 20 mm in length. As shown in FIG. 5, each case segment 51 was provided with a pair of projections 59 and 59' and a pair of projections 501 and 501', for fixedly holding the lens unit array; and a pair of connecting hooks 502, and a pair of holes 503 for receiving the connecting hooks 502 of the adjacent case segment 51. The case segments 51 were formed by molding an ABS resin containing carbon black, by an injection molding process. The measured thermal expansion coefficient of the case segments 51 was $7.4 \times 10^{-5}$ cm/cm/° C. The twelve case segments 51 were connected by engaging the connecting hooks 502 and the holes 503 and were joined firmly together by an epoxy adhesive, to thus construct a plastic case 240 mm in length. The relative warp between opposite ends of the plastic case was not greater than 1 mm.

The image-reading device was constructed by assembling the plastic case and the lens unit array employed in the image-reading device of example 1. The MTFs of the image-reading device over the entire width of the lens unit, measured by using a grid of four pairs of lines per millimeter, was 50% or above. The MTFs of the image-reading device after a heat cycle test conducted under a heating condition, as shown in FIG. 3, were 50% or above, which verified the excellent performance of the image-reading device.

Although the invention has been described in its preferred form with a certain degree of specificity, obviously many changes and variations are possible therein. It is therefore understood that the present invention may be practiced other than as specifically described herein, without departing from the scope and spirit thereof.

We claim:

1. An image-reading device comprising:
   a lens unit array formed by adhering an array of distributed refractive index cylindrical lens elements between plastic plates; and
   a plastic case containing the lens unit array;
   characterized in that a difference in thermal expansion coefficients of the plastic plates of the lens unit array and the plastic case is $5.0 \times 10^{-5}$ cm/cm/° C. or below.

2. An image-reading device according to claim 1, wherein the difference in the thermal expansion coefficients of the plastic plates of the lens unit array and the plastic case is $3.0 \times 10^{-5}$ cm/cm/° C. or below.

3. An image-reading device according to claim 1 or 2, wherein the plastic case comprises two or more case segments joined together in a longitudinal arrangement.

4. An image-reading device according to claim 3, wherein the case segments are produced by an injection molding process.

5. An image-reading device according to claim 3, wherein the length of the case segments is from 20 to 100 mm.

6. An image-reading device according to claim 1, wherein each of the case segments is provided internally with two pairs of projections for holding the lens unit array.

7. An image-reading device according to claim 3, wherein each of the case segments is provided with two or more connecting means for connecting the case segment to an adjacent case segment.

8. An image-reading device according to claim 4, wherein the length of the case segments is from 20 to 100 mm.

9. An image-reading device according to claim 5, wherein each of the case segments is provided internally with two pairs of projections for holding the lens unit array.

* * * * *